United States Patent [19]

Imayasu et al.

[11] 4,352,047
[45] Sep. 28, 1982

[54] SIDE PINCUSHION CORRECTING CIRCUIT FOR COLOR TELEVISION RECEIVERS

[75] Inventors: Tomoyoshi Imayasu; Katsuo Isono, both of Tokyo, Japan

[73] Assignee: Sony Corporation, Tokyo, Japan

[21] Appl. No.: 159,633

[22] Filed: Jun. 16, 1980

[30] Foreign Application Priority Data

Jun. 14, 1979 [JP] Japan .................. 54-74987

[51] Int. Cl.³ .............................. G01S 29/70
[52] U.S. Cl. .................... 315/370; 315/371
[58] Field of Search .............. 315/371, 12 ND, 370

[56] References Cited

U.S. PATENT DOCUMENTS 2,778,971  1/1957  Sunstein .............. 315/12 ND
2,863,937 12/1958  Kalfaian ............. 315/370 X
2,885,594  5/1959  Lesti ............... 315/12 ND X
3,147,340  9/1964  Ehrich ............. 315/12 ND X Primary Examiner—Malcolm F. Hubler
Attorney, Agent, or Firm—Lewis H. Eslinger; Alvin Sinderbrand

[57] ABSTRACT

A side pincushion correcting circuit is provided in a color television receiver of the type including a cathode ray tube having an index stripe disposed on a screen scanned by a cathode beam and a detector for detecting the scanning of the index stripe by the cathode beam and producing a pulse signal as a result of such detecting. The side pincushion correcting circuit comprises a pulse forming circuit for generating a reference signal in correspondence to the pulse signal from the detector, a phase comparator for comparing the phase of the reference signal to that of a control pulse, such as the horizontal flyback pulse, associated with the commencement of scanning in the horizontal direction, and providing an output signal whose magnitude is proportional to the phase difference between the reference signal and the control pulse, and a horizontal deflection circuit supplied with the output signal from the phase comparator for controlling the scanning of the cathode beam in the sense to correct for side pincushion distortion.

7 Claims, 16 Drawing Figures

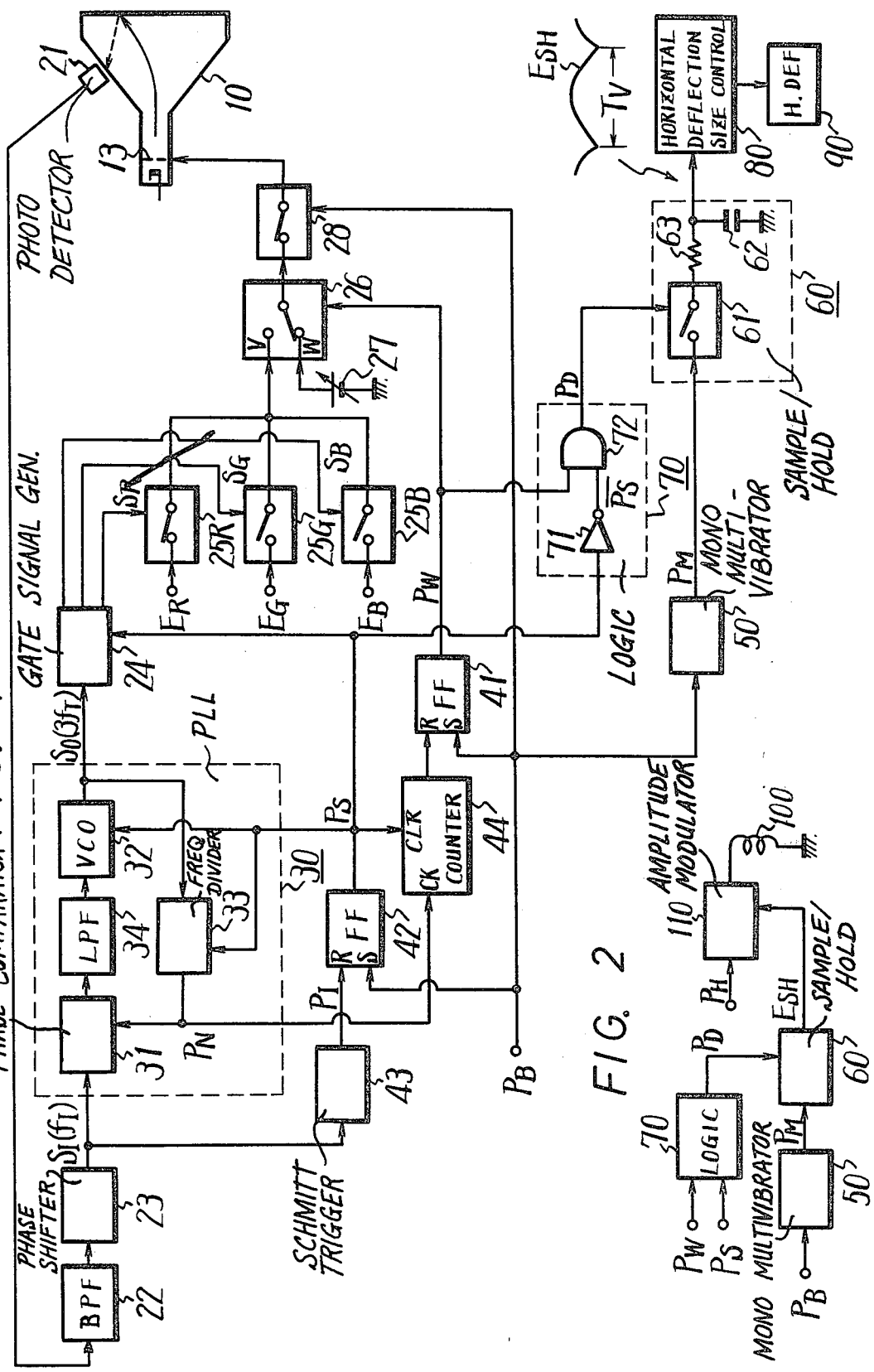

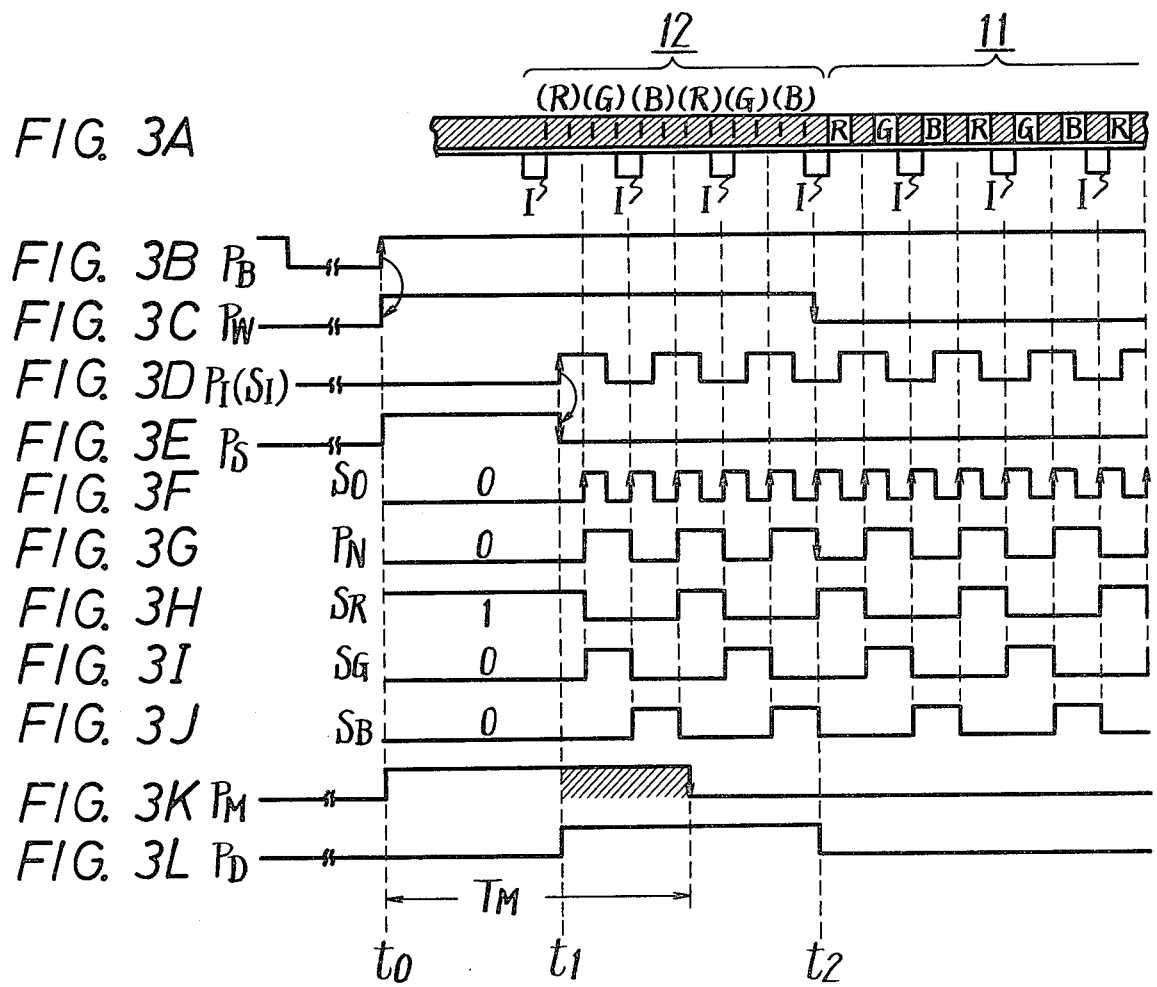

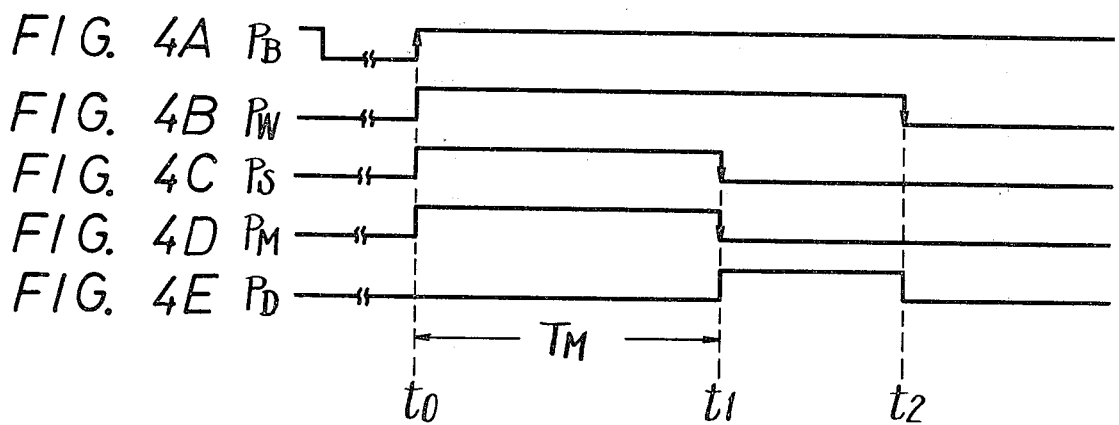
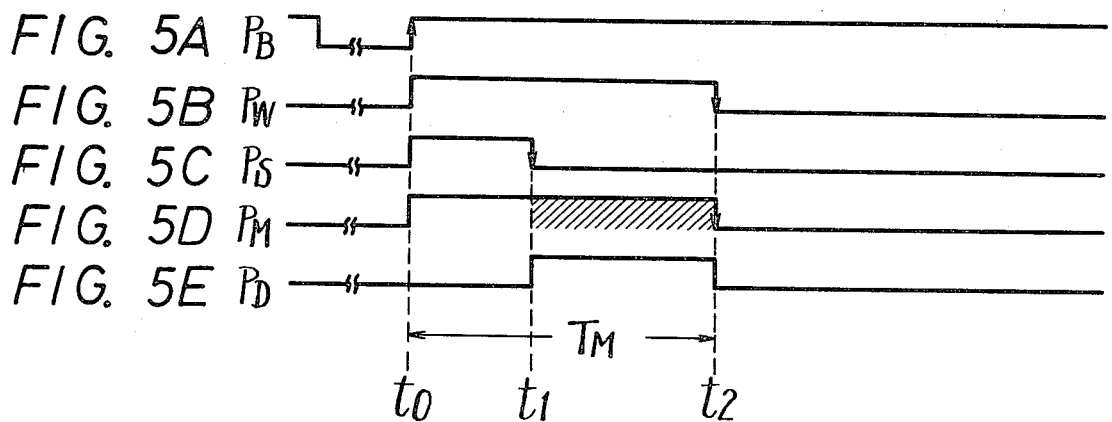

SIDE PINCUSHION CORRECTING CIRCUIT FOR COLOR TELEVISION RECEIVERS

BACKGROUND OF THE INVENTION

1. Field of the Invention

This invention relates to a side pincushion correcting circuit for color television receivers, and more particularly relates to an improved side pincushion correcting circuit for beam index type color television receivers. This invention is especially directed to such a correcting circuit which can correct side pincushion distortion almost completely while simultaneously correcting any variation in horizontal amplitude.

2. Description of the Prior Art

A beam index type color television receiver uses a picture tube havng a phosphor screen on which there are disposed red, green, and blue vertical color phosphor stripes which are scanned in the horizontal direction, as well as index phosphor stripes disposed on the inner surface thereof which are also scanned in the horizontal direction. The picture tube has a single electron beam which scans at least one such index phosphor stripe to produce an index signal. This index signal is supplied to, for example, a phase-locked loop to derive therefrom an output signal which is adapted to change-over the video color signal applied to modulate the beam, so that when the red color phosphor stripe is scanned by the electron beam, the red primary color signal is supplied to the picture tube, when the green color phosphor stripe is scanned, the green primary color signal is supplied to the picture tube, and when the blue color phosphor stripe is scanned, the blue primary color signal is supplied to the picture tube, for density modulation.

The frequency of the index signal is in inverse proportion to the pitch of index phosphor stripes and in proportion to the scanning speed of electron beams. Therefore, when side or horizontal pincushion distortion causes the scanning speed of the electron beam to change at each line, that is, as the position of the beam changes in the vertical direction, the frequency of the index signal is changed at each line (in the vertical direction) and in extreme instances exceeds the lock-in range of the phase-locked loop so that accurate color reproduction is likely to be impaired. Particularly, when the picture screen is dark and the index signal is weak, the lock-in range of the phase-locked loop is reduced and hence the above likelihood of impaired color reproduction is increased.

In the prior art, a conventional television receiver is adapted to correct side pincushion distortion in such a manner that a supply voltage furnished to the horizontal deflection circuit is modulated by a parabolic waveform having a (or field) period, and a saturable reactor is connected in series to a horizontal deflection coil so that the latter affects the horizontal deflection of the electron beam in accordance with the parabolic waveform with vertical period. However, satisfactory correction of side pincushion distortion in a beam index type picture tube can not be achieved by these methods. Additionally, changes in horizontal amplitude due to changes in high voltage or the like must be separately corrected.

OBJECTS AND SUMMARY OF THE INVENTION

Accordingly, it is a principal object of this invention to provide a novel side pincushion correcting circuit for color television receivers that is free from the above mentioned drawbacks.

It is another object of this invention to provide a side pincushion correcting circuit capable of correcting side pincushion distortion almost perfectly, while simultaneously correcting any change in horizontal amplitude due to changes in high voltage or the like, by means of a simple construction particularly suited for a beam index type color television receiver.

According to an aspect of this invention, for a color television receiver including a cathode ray tube having beam emitting means, such as an electron gun, for emitting at least one cathode beam, a display screen to be scanned by the cathode beam in a raster pattern constituted by horizontal lines, the scanning commencing for each horizontal line in correspondence to a horizontal control pulse signal, and having at least one index stripe disposed thereon, and a detector for detecting the scanning of the index stripe by the cathode beam and generating a signal in response to such detecting. The side pincushion correcting circuit comprises a pulse forming circuit for generating a reference pulse signal corresponding to the signal generated by the detector, a phase comparator providing an output whose magnitude depends upon the difference in phase between the reference pulse signal and the horizontal control pulse signal, and a horizontal deflection circuit supplied with the output of the phase comparator for controlling the scanning of the cathode beam in the sense to correct for side pincushion distortion. Preferably, the flyback pulse is used as the horizontal control pulse signal.

Various other objects, features, and advantages of this invention will be apparent from the following description taken in conjunction with the accompanying drawings.

BRIEF DESCRIPTION OF THE DRAWINGS

FIG. 1 is a systematic block diagram showing one embodiment of a side pincushion correcting circuit for a beam index type color television receiver according to this invention;

FIG. 2 is a systematic block diagram showing the essential elements of another embodiment of this invention;

FIG. 3A is a view showing one part of a phosphor screen of a picture tube and FIGS. 3B through 3L are views showing waveforms of respective pulse signals used in explaining this invention;

FIGS. 4A to 4E and FIGS. 5A to 5E are views showing waveforms used for explaining side pincushion correction according to this invention;

DESCRIPTION OF THE PREFERRED EMBODIMENT

Figure 6:
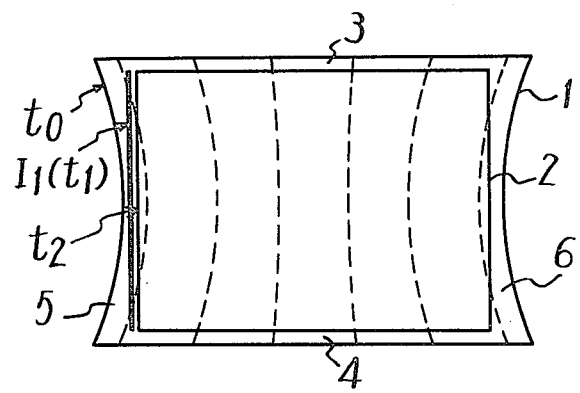
FIGS. 6 and 7 are views showing types of side pincushion distortion on a video raster.

A description will hereinafter be given on one embodiment of the circuit of this invention with reference to the drawings.

FIG. 1 shows one embodiment of a side pincushion correcting circuit for beam index type color television receivers according to this invention. In FIG. 1, a beam index type picture tube 10 extends, as shown in FIG. 3A by way of example, over an effective picture screen portion 11 provided with red, green and blue color phosphor stripes R, G, and B, and also extends across a horizontal scan starting portion, or run-in portion 12 at the left side of the above portion 11 on which there are formed index phosphor stripes I at a pitch which is ⅔ of the pitch of a triad, or set of three color phosphor stripes R, G, and B. The picture tube 10 is also provided with a photodetector 21 on the outside of its funnel portion.

In the circuit of FIG. 1, a flyback pulse $P_B$ (FIG. 3B) is supplied to a switch 28 to turn it OFF during intervals in which the pulse $P_B$ is "0", that is, during the horizontal and vertical retrace intervals, so that the picture tube 10 may be cut off, and to turn it ON during intervals in which the pulse $P_B$ is "1", that is, during the trace or scanning intervals.

The flyback pulse $P_B$ is also supplied to an RS flip-flop 41 at its set, or S-terminal to set it by the occurrence of the trailing edge of pulse $P_B$ so that its output signal $P_W$ becomes "1" as shown in FIG. 3C. This output signal $P_W$ is supplied to a switch 26 to cause the same to change over to contact a terminal W, which is coupled to a voltage source 27, during those intervals in which the output signal $P_W$ is "1". Thus, during the trace interval, a DC voltage from voltage source 27 is furnished through the switch 28 to a first grid 13 of the picture tube 10 so that an electron beam may scan the horizontal scan starting portion 12 with a relatively large and constant beam strength. As a Photodetector 21 is adapted to detect light emanating from the index phosphor stripe I of the horizontal scan starting portion 12 to produce a pulse signal.

The pulse signal of the photodetector 21 is supplied through a band-pass filter 22 to a phase shifter 23 for adjusting the phase to derive therefrom an index signal $S_I$ (FIG. 3D) having a frequency $f_I$ which is determined by the pitch of index phosphor stripes I and the scanning speed of the electron beam. This signal $S_I$ is supplied to a phase-locked loop (PLL) 30.

In the PLL 30, the index signal $S_I$ is supplied to a phase comparator 31. At the same time, an output signal $S_O$ of a voltage-controlled oscillator 32 is fed to a frequency divider 33 where it is frequency-divided into 1/N, or ½ in the example shown in FIG. 3A, to produce as its output a frequency-divided signal $P_N$ (FIG. 3G) which is supplied to the phase comparator 31 where it is compared in phase with the index signal $S_I$ from the phase shifter 23. Then, phase comparator 31 supplies a resulting output voltage through a low-pass filter 34 to the oscillator 32.

Meanwhile, flyback pulse $P_B$ is further supplied to another RS flip-flop 42 at its set, or S-terminal to set the same by the occurrence of the trailing edge of the pulse $P_B$ so that its output signal $P_S$ becomes "1" as shown in FIG. 3E. At the same time, index signal $S_I$ is furnished from the phase shifter 23 to, for example, a Schmidt trigger circuit 43, which in turn provides an index pulse $P_I$ as shown in FIG. 3D. This index pulse $P_I$ is supplied to the reset, or R-terminal of the flip-flop 42 to reset the same by its first rising edge so that the output signal $P_S$ of the flip-flop 42 becomes "0" as shown in FIG. 3E.

The output signal $P_S$ of the flip-flop 42 is supplied to the oscillator 32 in the PLL 30 to control the oscillating phase of the oscillator 32. In other words, as shown in FIG. 3E, during the interval from the rear edge of the flyback pulse $P_B$ to the first rising edge of the index pulse $P_I$, that is, during the interval where the signal $P_S$ is "1", the oscillator 32 ceases its oscillation and its output signal $S_O$ remains in the condition "0" as shown in FIG. 3F. When the signal $P_S$ becomes "0" upon the occurrence of the first rising edge of the index pulse $P_I$, the oscillator 32 resumes its oscillation and its output signal $S_O$ alternates between the states "0" and "1". Accordingly, the phase of the output signal $S_O$ is determined as shown in FIG. 3F with respect to the index pulse $P_I$.

The output signal $P_S$ of the flip-flop 42 is also supplied to the frequency divider 33 in the PLL 30 to control its condition. In other words, the screen of the picture tube 10 is assumed to be arranged as shown in FIG. 3A. Further, if the frequency divider 33 is formed as a ½ frequency divider, the frequency divider 33 can be formed of a single flip-flop. In this case, this flip-flop of the frequency divider 33 is triggered by the rising edges of the output signal $S_O$ of the oscillator 32. Such flip-flop is also cleared during the interval that the signal $P_S$ is "1" and hence its output signal $P_N$ is becomes "0".

As mentioned above, the output $P_S$ of the flip-flop 42 acts to determine the phase of the output signal $S_O$ of the oscillator 32 with respect to the index signal $S_I$ and also acts to control the condition of the frequency divider 33. As a result, at the point in time of the first rising edge of the index pulse $P_I$, the output signal $P_N$ of the frequency divider 33 is delayed in phase by only 90° with respect to the index signal $S_I$ as shown in FIG. 3G, and hence the PLL 30 is immediately locked into the correct phase.

When the PLL 30 is locked, the output signal $S_O$ of the oscillator 32 has a frequency which is twice the frequency of the index signal $S_I$, that is, a frequency $(3f_T)$ which is three times that of the so-called triplet frequency $f_T$ determined by the pitch of a triad (or triplet) of color phosphor stripes R, G, and B, and by the scanning speed of the electron beams. Also, if it is considered that phantom (i.e. imaginary) color phosphor stripes (R), (G), and (B) are formed in the horizontal scan starting portion 12 extending from the effective picture screen portion 11, the phase of the signal $S_O$ is such that each rising edge thereof exactly corresponds to the juncture of an adjacent two of the respective phantom color phosphor stripes (R), (G), and (B) as shown in FIGS. 3A and 3F.

The output signal $S_O$ of the PLL 30 is supplied to a gate signal generator 24 to produce three-phase gate signals $S_R$, $S_G$, and $S_B$ (FIGS. 3H, 3I, and 3J), which are respectively adapted to gate red, green, and blue primary color signals. In this case, the output signal $P_S$ of the flip-flop 42 is also supplied to the gate signal generator 24 as a mode set pulse so that the phases of the gate signals $S_R$, $S_G$, and $S_B$ are adjusted by this signal $P_S$.

In other words, the gate signal generator 24 can be formed by a ring counter having three-stage JK flip-flops. The first-, second-, and third-stage flip-flops produce respective Q-outputs which are used as gate signals $S_R$, $S_G$, and $S_B$, respectively. In this case, during the interval in which the output signal $P_S$ of the flip-flop 42 is "1", the first-stage flip-flop is preset to make the gate signal $S_R$ "1" while the second- and third-stage flip-flops are cleared to make the gate signals $S_G$ and $S_B$ "0". When the signal $P_S$ becomes "0" by the occurrence of the first rising edge of the index pulse $P_I$, the respective outputs of the flip-flops are shifted at every rising edge of the signal $S_O$ and the gate signals $S_R$, $S_G$, and $S_B$ respectively become "1" at the positions of the red, green, and blue color phosphor stripes R, G, and B, provided that the respective stripes R, G, and B are actually only phantom stripes in the horizontal scan starting portion 12 extending from the effective picture screen portion 11 through, and they are not actually formed in the former portion.

Meanwhile, there is provided a counter 44, which is connected at its CLR-terminal to the output end of the flip-flop 42 and also is connected at its CK-terminal to the output end of the frequency divider 33 of the PLL 30. Thus, when the output signal $P_S$ of the flip-flop 42 is "1", the counter 44 is cleared, and when the signal $P_S$ becomes "0" at the first rising of the index pulse $P_I$, the falling of the signal $P_N$ from the frequency divider 33 is counted by the counter 44. Then, when signal $P_N$ has fallen for a predetermined number of times, as indicated by an arrow in FIG. 3G, thus indicating a point in time when the horizontal scan starting portion 12 has terminated, the output of the counter 44 is applied to the reset, or R-terminal of the flip-flop 41 to reset the same so that its output signal $P_W$ becomes "0" as shown in FIG. 3C to change-over the switch 26 to contact a terminal V which is coupled to receive primary color signals $E_R$, $E_G$, and $E_B$. Switches 25R, 25G, and 25B are each supplied, at one terminal thereof, with red, green, and blue primary color signals $E_R$, $E_G$, and $E_B$ and connected at the other terminals thereof to the V-terminal of the switch 26. The switches 25R, 25G, and 25B are also supplied with gate signals $S_R$, $S_G$, and $S_B$ from the gate signal generator 24 to control the changing-over of the respective switches 25R, 25G, and 25B.

With the above arrangement, when the switch 26 is changed over to the V-termintal, that is, when the effective picture screen portion 11 is being scanned, at respective positions of the red, green, and blue color phosphor stripes R, G, and B, and when the gate signals $S_R$, $S_G$, and $S_B$ respectively become "1", the switches 25R, 25G, and 25B are alternately changed over to be ON so that the red, green, and blue primary color signals $E_R$, $E_G$, and $E_B$ are respectively supplied through the switches 26 and 28 to the first grid 13 of the picture tube 10.

In this invention, the time period from the horizontal retrace interval or flyback pulse to the detection of the first index phosphor stripe is made constant by controlling the amplitude of the horizontal deflection signal.

That is, the flyback pulse $P_B$ is supplied to a monostable multivibrator 50 to trigger the same, for example, by its trailing edge so that the multivibrator 50 provides an output signal $P_M$ that becomes "1" during a certain time $T_M$ starting from a point of time $t_0$ corresponding to the trailing edge of the flyback pulse $P_B$ as shown in FIG. 3K. This output signal $P_M$ is supplied to a sample-and-hold circuit 60 serving as a phase comparator.

At the same time, the output signal $P_S$ of the flip-flop 42 and the output signal $P_W$ of the flip-flop 41 are supplied to a logic circuit 70 to derive therefrom a signal $P_D$ which is "1" during an interval between a point in time $t_1$ when the signal $P_S$ drops down to "0", and a point in time $t_2$ when the signal $P_W$ drops down to "0", as shown in FIG. 3L. The logic circuit 70 is composed of, for example, an inverter 71 and an AND gte 72. The signal $P_S$ is inverted by the inverter 71 and the thus-inverted signal $\overline{P}_S$ is supplied to the AND gate 72 together with the signal $P_W$ from the flip-flop 41. The AND gate 72 then provides the signal $P_D$. This signal $P_D$ is supplied to a switch 61 of the sample-and-hold circuit 60 as its sampling pulse so that the switch 61 is turned ON during the interval in which the signal $P_D$ is "1". In this case, since the monostable multivibrator 50 is connected to the switch 61, the output signal $P_M$ of the multivibrator 50 is sampled and fed through a resistor 63 to a capacitor 62 so that a sample-and-hold voltage $E_{SH}$ is obtained at one plate of the capacitor 62 at the junction thereof with the resistor 63. This sample-and-hold voltage $E_{SH}$ is supplied to a horizontal deflection size-controlling circuit 80 for correcting side pincushion distortion. The horizontal deflection size controlling circuit 80 is formed as a supply voltage modulating circuit of a horizontal deflection circuit 90 so that the supply voltage to the horizontal deflection circuit 90 is modulated by the sample-and-hold voltage $E_{SH}$. In this case, when the voltage $E_{SH}$ is large, the supply voltage is made correspondingly large.

During a time period between the points of time $t_0$ and $t_1$ when the interval where the output signal $P_S$ of the flip-flop 42 is "1" is long and coincides with the interval where the output signal $P_M$ of the multivibrator 50 as shown in FIGS. 4C and 4D, only the interval of the signal $P_M$ in its "0" state is sampled at the sample-and-hold circuit 60, and the sample-and-hold voltage $E_{SH}$ becomes a minimum. In contrast to this, during a time period between the time points $t_0$ and $t_1$ when the interval where the signal $P_S$ is "1" is short as shown in FIG. 5C and the interval where the output signal $P_W$ is "1" coincides with the interval where the signal $P_M$ is "1" as shown in FIG. 5B and in FIG. 5D, only the interval of the signal $P_M$ in its "1" state (shaded portion of FIG. 5D) is sampled at the sample-and-hold circuit 60 and the sample-and-hold voltage $E_{SH}$ becomes a maximum.

That is, in the sample-and-hold circuit 60, the output signal $P_M$ of the monostable multivibrator 50 is compared in phase with the signal $P_D$ from the logic circuit 70, the time interval between the point of time $t_0$, corresponding to the termination of the horizontal retrace interval, and the point of time $t_1$, corresponding to the first rising of the index pulse $P_I$, is detected, and the sample-and-hold voltage $E_{SH}$ changes its value in accordance with length of the interval between the point of time $t_0$ and $t_1$.

FIG. 6 shows the horizontal or side pincushion distortion appearing on a raster 1 displayed upon an effective picture screen 2, and having an upper overscan portion 3, a lower overscan portion, 5 a left overscan portion 5, and a right overscan portion 6. As will be apparent from FIG. 6, the interval, from the point of time $t_0$ corresponding to the end of the horizontal retrace interval to the point of time $t_1$ where the first index phosphor stripe $I_1$ is detected as the first rising of the index pulse $P_I$, will be comparatively long at the upper and lower portions on the picture screen but short at its center.

Figure 8:
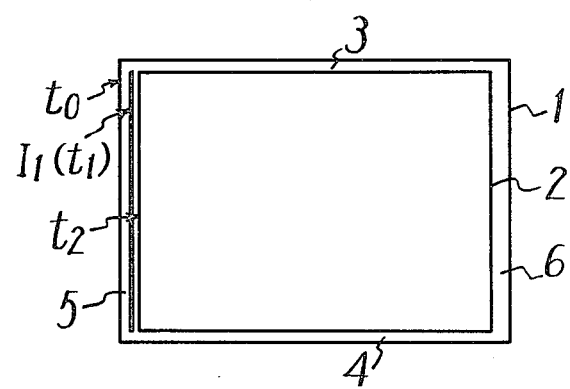
FIG. 8 is a view showing the raster in which side pincushion distortion has been corrected.

Accordingly, the sample-and-hold voltage $E_{SH}$ becomes small at the upper and lower portions on the picture screen but large at its center so that the waveform of sample-and-hold voltage $E_{SH}$ becomes of parabolic shape with a vertical, or field period $T_V$ as shown in FIG. 1. As a result, at the upper and lower portions on the picture screen the supply voltage of the horizontal deflection circuit 90 is made small and the horizontal deflection current is made correspondingly small to reduce the horizontal amplitude, while at the center on the picture screen the supply voltage of the horizontal deflection circuit 90 is made large and the horizontal deflection current is made correspondingly large to expand the horizontal amplitude. In other words, the horizontal amplitude is so controlled that the interval from the point of time $t_0$ to the point of time $t_1$ may become constant as shown in FIG. 3 with the result that the horizontal pincushion distortion on the raster 1 is corrected as shown in FIG. 8 and the horizontal amplitude becomes constant.

FIG. 2 shows another embodiment of this invention, in which a correcting horizontal deflection coil 100 is provided relative to the picture tube 10 in addition to the main horizontal deflection coil, and the voltage $E_{SH}$ from the sample-and-hold circuit 60 is supplied to an amplitude modulator 110 wherein a horizontal pulse $P_H$ applied thereto is amplitude-modulated by this voltage $E_{SH}$. The pulse $P_H$ thus amplitude-modulated is supplied to the correcting horizontal deflection coil 100. The horizontal pulse $P_H$ is integrated by the coil 100 so that a correcting horizontal deflection current in a sawtooth waveform flows therethrough. Then, this correcting horizontal deflection current is amplitude-modulated by the parabolic-wave voltage $E_{SH}$ with the vertical period $T_V$ (FIG. 1) and hence the horizontal amplitude of the displayed video raster becomes constant similarly as with the embodiment of FIG. 1.

As described above, according to this invention, the horizontal pincushion distortion can be almost perfectly corrected and at the same time the variation in horizontal amplitude due to any variation in high voltage or the like can also be corrected. Thus, since the horizontal amplitude becomes constant, the frequency of the index signal becomes equal at each line thus, even when the picture screen is dark and the index signal is weak, the phase-locked loop remains positively locked in phase, thereby ensuring that stable color reproduction is carried out. Accordingly, even though a beam current is arranged to flow even during black portions so as to assure that the index signal occurs regardless of the picture content of the video signal, this beam current can be made small with the result that the contrast can be improved. In addition, further fine adjustment of the raster scanning is rendered substantially unnecessary.

Figure 7:
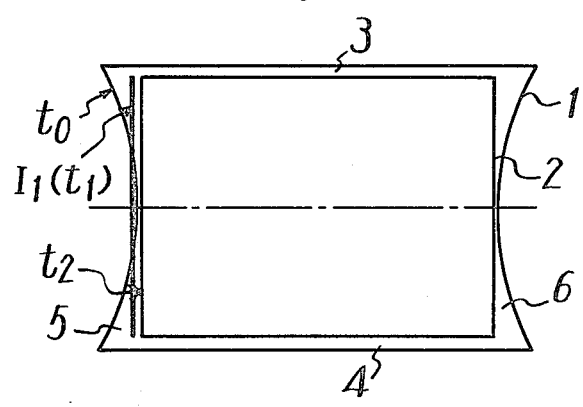

Next, if, as shown in FIG. 7 the left end of the raster 1 intrudes beyond the right side of the first index phosphor stripe $I_1$ at the center of the picture screen, the first rising of the index pulse $P_I$ will not correspond to the first index phosphor stripe $I_1$ and hence the mode set is likely to be wrong so the color phasing is inaccurate. However, according to this invention the left end of the raster 1 is always adjusted to occur at the left side of the first index phosphor stripe $I_1$ and hence the mode set will not be wrong.

This invention can be applied not only to beam index type color television receivers but also to normal color and monochrome television receivers. For example, in the type of color television receiver in which fine vertical red, green, and blue color phosphor stripes are disposed on its phosphor screen, in order, in the horizontal direction with red, green, and blue electron beams being arranged in an in-line configuration, and in which a number of vertical grid wires are arranged in order in the horizontal direction on the inner side of the phosphor screen or controlling the position at which each electron beam impinges onto the phosphor screen, one grid wire at the left end can be insulated from the rest so that when an electron beam strikes the above grid wire, a signal is picked up and transmitted to the outside of the picture tube, for example by capacitive coupling, and the horizontal amplitude can be controlled so that a time period from the horizontal retrace interval to a time when the above signal is obtained may become constant.

It will be apparent that many changes and variations can be effected without departing from the scope and spirit of the present invention.

We claim as our invention:

1. In a television receiver including a cathode ray tube having beam emitting means for emitting a cathode beam; display means to be scanned by said beam in a raster pattern constituted by horizontal lines, the scanning commencing for each such horizontal line in correspondence to a horizontal control pulse signal, and having at least one index stripe disposed thereon; and detector means for detecting the scanning of said index stripe by said cathode beam and generating a signal in response to such detecting; a side pincushion correcting circuit comprising:
   pulse forming circuit means for generating a reference pulse signal corresponding to the signal generated by said detector means;
   phase comparator means providing an output whose magnitude depends on the difference in phase between said reference pulse signal and said horizontal control pulse signal; and
   horizontal deflection circuit means supplied with the output of said phase comparator means for controlling the scanning of said cathode beam in the sense to correct for side pincushion distortion.

2. A television receiver according to claim 1, wherein said horizontal control pulse signal is a flyback pulse.

3. A television receiver according to claim 1, wherein said cathode ray tube is a beam index type color picture tube, and said detector means includes a photodetector for detecting the scanning of said index stripe by said cathode beam.

4. A television receiver according to claim 1, wherein said pulse forming circuit means provides said reference pulse signal to be coincident in phase with the signal generated by the detector means and to have a predetermined pulse width.

5. A television receiver according to claim 1, wherein said phase comparator means includes a monostable multivibrator having an input coupled to receive said horizontal control pulse signal and an output, and a sample-and-hold circuit having an input coupled to the output of said monostable multivibrator and a control terminal coupled to said pulse forming circuit means.

6. A television receiver according to claim 1, wherein said cathode beam is deflected by means of a main horizontal deflection circuit supplied with a supply voltage, and said horizontal deflection circuit means includes a horizontal deflection size controlling circuit for modulating the supply voltage by the output of said phase comparator means.

7. A television receiver according to claim 1, wherein said horiziontal deflection circuit means includes a correcting deflection coil and modulator means for supplying to said coil a sawtooth signal that varies in strength in dependence on the output of said phase comparator means.

* * * * *